United States Patent
Konno et al.

(10) Patent No.: US 10,391,935 B2
(45) Date of Patent: Aug. 27, 2019

(54) VEHICLE APPROACH NOTIFICATION DEVICE

(71) Applicant: Panasonic Intellectual Property Management Co., Ltd., Osaka (JP)

(72) Inventors: Fumiyasu Konno, Osaka (JP); Shinnosuke Nagasawa, Osaka (JP); Ichiro Ohno, Osaka (JP); Koichi Sakamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/072,928

(22) PCT Filed: Jan. 24, 2017

(86) PCT No.: PCT/JP2017/002249
§ 371 (c)(1),
(2) Date: Jul. 26, 2018

(87) PCT Pub. No.: WO2017/138349
PCT Pub. Date: Aug. 17, 2017

(65) Prior Publication Data
US 2019/0071011 A1  Mar. 7, 2019

(30) Foreign Application Priority Data
Feb. 10, 2016 (JP) .................. 2016-024146

(51) Int. Cl.
*B60Q 1/22* (2006.01)
*B60Q 5/00* (2006.01)
(Continued)

(52) U.S. Cl.
CPC ............... *B60Q 5/008* (2013.01); *B60Q 5/00* (2013.01); *B60R 11/0217* (2013.01);
(Continued)

(58) Field of Classification Search
CPC ........... B60Q 5/008; B60Q 5/00; B60R 11/02; G10K 2210/1282
(Continued)

(56) References Cited

U.S. PATENT DOCUMENTS 9,580,010 B2 * 2/2017 Sakakibara ............ B60Q 5/008
9,934,685 B1 * 4/2018 Bernhardt .............. G08G 1/095
(Continued)

FOREIGN PATENT DOCUMENTS

JP          5-208636        8/1993
JP          11-285093       10/1999

OTHER PUBLICATIONS

International Search Report of PCT application No. PCT/JP2017/002249 dated Mar. 21, 2017.

*Primary Examiner* — Toan N Pham
(74) *Attorney, Agent, or Firm* — Greenblum & Bernstein P.C.

(57) ABSTRACT

Provided is a vehicle approach notification device that can easily output a warning sound in which a discomfort feeling brought to an occupant is reduced while ensuring a necessary sound pressure. A vehicle approach notification device includes: a sound source; first and second amplifiers; a first speaker system including a first speaker and a second speaker that outputs a sound having an opposite phase to a sound output from the first speaker; and a second speaker system including a third speaker that outputs a sound having a same phase as the sound output from the first speaker and a fourth speaker that outputs a sound having an opposite phase to the sound output from the third speaker, wherein the first speaker system and the second speaker system are disposed so that the first speaker and the third speaker are located closer to a longitudinal center plane of the vehicle than the second speaker and the fourth speaker.

5 Claims, 7 Drawing Sheets

(51) Int. Cl.
  *H04R 3/12*    (2006.01)
  *H04R 1/40*    (2006.01)
  *B60R 11/02*   (2006.01)
  *G10K 11/178*  (2006.01)

(52) U.S. Cl.
  CPC ........... *G10K 11/178* (2013.01); *H04R 1/403* (2013.01); *H04R 3/12* (2013.01); *G10K 2210/1282* (2013.01); *H04R 2499/13* (2013.01)

(58) Field of Classification Search
  USPC .............................................. 340/463, 425.5
  See application file for complete search history.

(56) References Cited

U.S. PATENT DOCUMENTS

| | | | |
|---|---|---|---|
| 2015/0269925 A1* | 9/2015 | Kanaya | B60Q 5/008 381/71.4 |
| 2017/0096099 A1* | 4/2017 | Matsubara | B60Q 5/008 |
| 2018/0334096 A1* | 11/2018 | Yamamoto | B60Q 5/00 |

\* cited by examiner

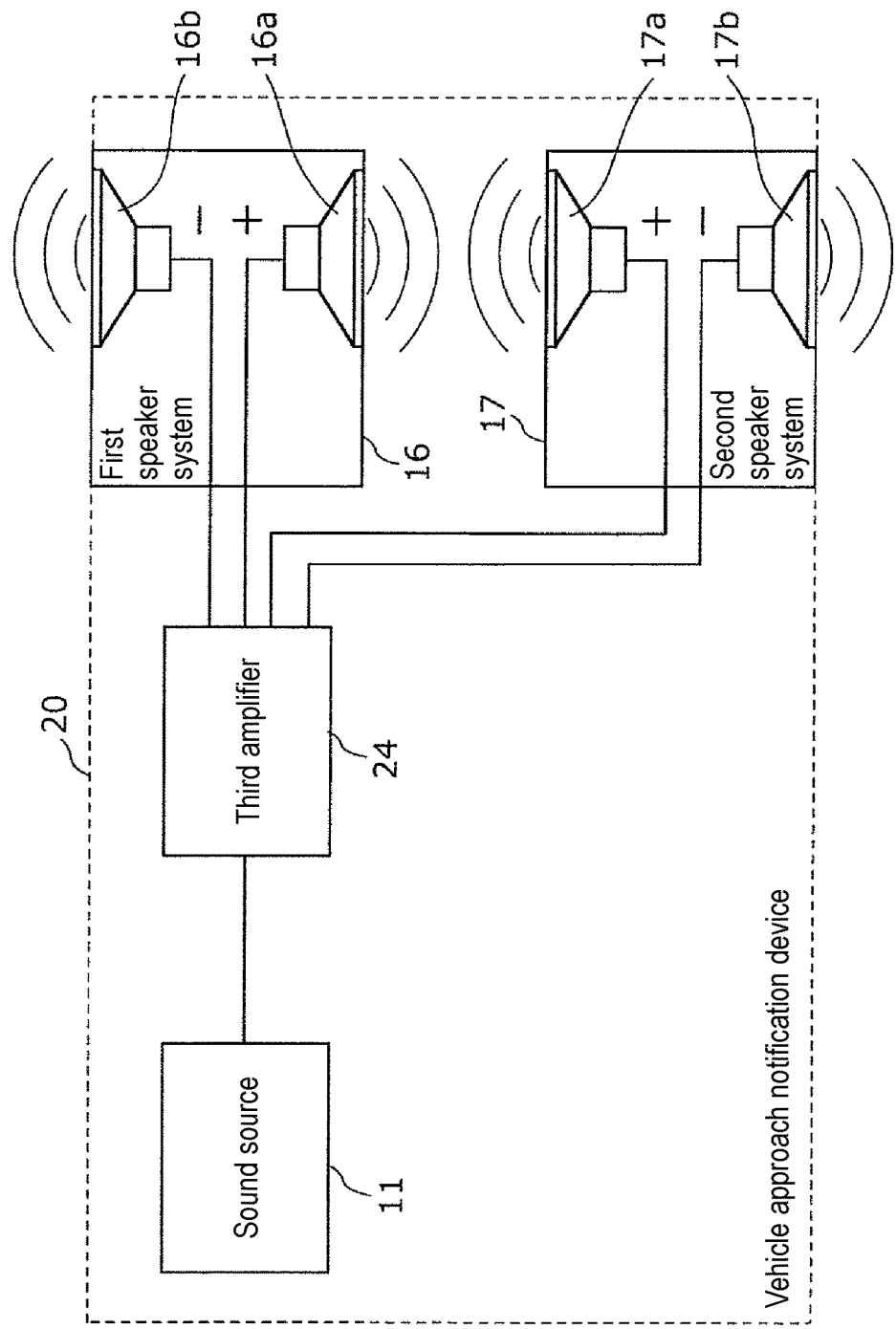

VEHICLE APPROACH NOTIFICATION DEVICE

This application is a U.S. national stage application of the PCT International Application No. PCT/JP2017/002249 filed on Jan. 24, 2017, which claims the benefit of foreign priority of Japanese patent application No. 2016-024146 filed on Feb. 10, 2016, the contents all of which are incorporated herein by reference.

TECHNICAL FIELD

The present disclosure relates to a vehicle approach notification device mounted on a vehicle and externally outputting a warning sound for making a notification about approach of a vehicle.

BACKGROUND ART

Since each of an electrically driven vehicle and a hybrid vehicle has a low noise, a pedestrian or the like hardly perceives approach of this vehicle when the vehicle travels at low speed at which a road noise of the vehicle itself is small. For this reason, such a low-noise vehicle as the electrically driven vehicle and the hybrid vehicle includes a vehicle approach notification device that generates a warning sound which is a continuous sound evoking a traveling state of the vehicle during traveling to thereby warn a pedestrian or the like about approach of the vehicle (for example, see PTLs 1 and 2).

CITATION LIST

Patent Literature

PTL 1: Unexamined Japanese Patent Publication No. H5-208636
PTL 2: Unexamined Japanese Patent Publication No. H11-285093

SUMMARY OF THE INVENTION

When such a vehicle approach notification device generates the warning sound externally, the warning sound penetrates the vehicle and brings a discomfort feeling to an occupant in the vehicle.

An object of the present disclosure is, therefore, to provide a vehicle approach notification device that can output a warning sound from which the discomfort feeling to be brought to the occupant is reduced.

A vehicle approach notification device according to an aspect of the present disclosure includes: a sound source configured to output a signal corresponding to one sound for making a notification about approach of a vehicle; an amplifier configured to amplify the signal output from the sound source; a first speaker system; and a second speaker system. The first speaker system has a first speaker configured to output a sound based on the signal amplified by the amplifier, and a second speaker configured to output a sound having an opposite phase to the sound output from the first speaker. The second speaker system has a third speaker configured to output a sound having a same phase as the sound output from the first speaker, and a fourth speaker configured to output a sound having an opposite phase to the sound output from the third speaker. The first speaker system and the second speaker system are disposed so that the first speaker and the third speaker are located closer to a longitudinal center plane of the vehicle than the second speaker and the fourth speaker.

These general or specific aspects may be implemented by a system, a method, an integrated circuit, a computer program, or a computer-readable recording medium such as a CD-ROM. Moreover, these general or specific aspects may be implemented by an arbitrary combination of the system, the method, the integrated circuit, the computer program, and the recording medium.

The present disclosure can provide a vehicle approach notification device that can easily output the warning sound in which a discomfort feeling brought to the occupant is reduced while ensuring a necessary sound pressure.

BRIEF DESCRIPTION OF DRAWINGS

FIG. 5 is a block diagram of a vehicle approach notification device according to a modification of the first exemplary embodiment.

Figure 1:
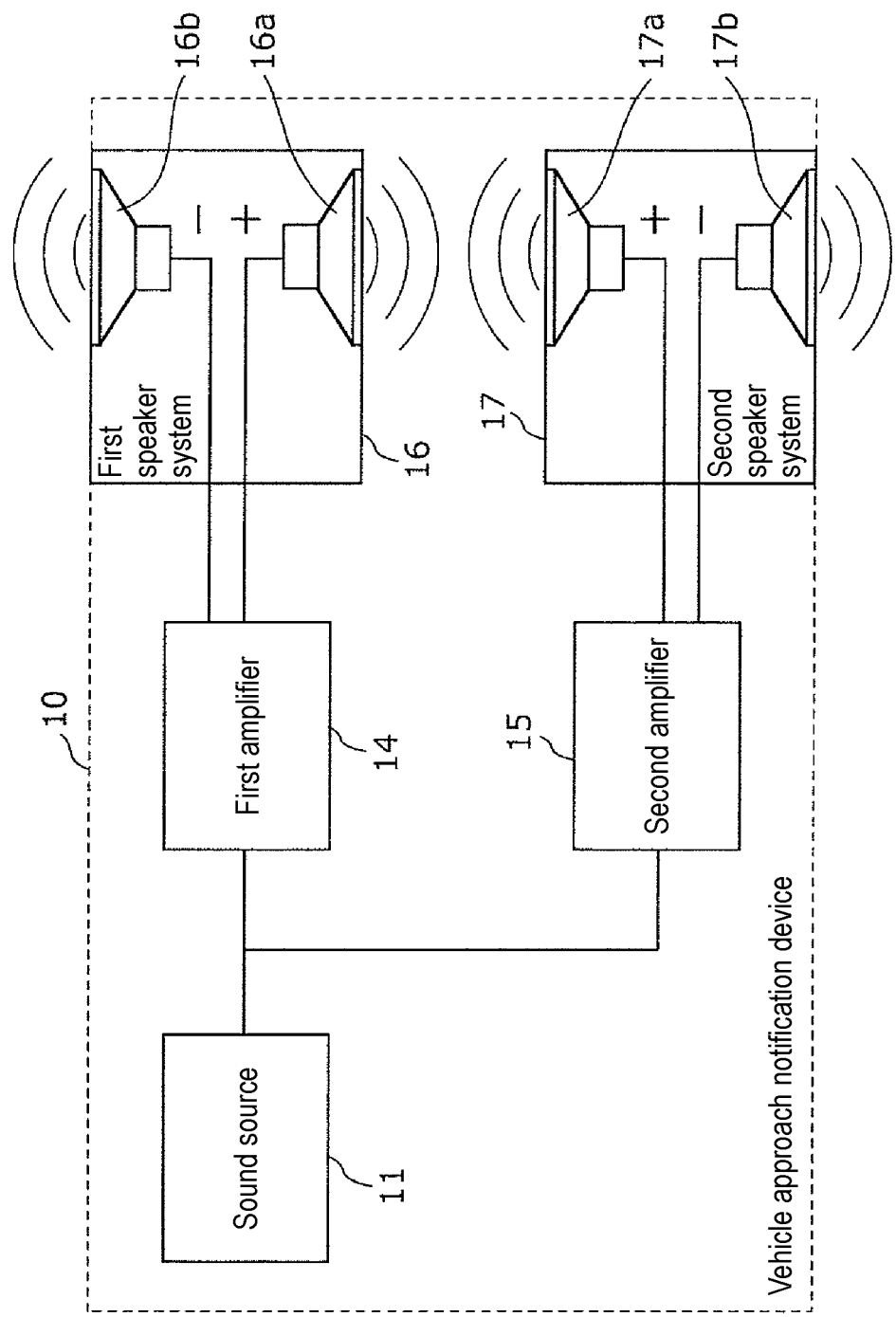
FIG. 1 is a block diagram illustrating a configuration of a vehicle approach notification device according to a first exemplary embodiment.

DESCRIPTION OF EMBODIMENTS (Knowledge Underlying the Present Invention)

A conventional vehicle approach notification device includes a speaker that generates a warning sound, a sound source that outputs a signal corresponding to the warning sound, and an amplifier that amplifies the signal output from the sound source to output the amplified signal to the speaker.

A warning sound source for a vehicle, which is described in PTL 1, includes a vehicle exterior speaker and a vehicle interior speaker, a microphone provided at a vehicle interior position where a sound is desired to be reduced, and an adaptive controller. The warning sound source for a vehicle generates a warning sound from the vehicle exterior speaker via an amplifier according to a reference signal. At this time, the adaptive controller identifies inverse transfer characteristics to transfer characteristics of a vehicle interior space transfer system by the reference signal and an input of the microphone, and controls an output sound of the vehicle interior speaker via the amplifier so that the input of the microphone becomes minimum.

Moreover, a vehicle-mounted warning sound device described in PTL 2 generates a control sound for controlling directional characteristics of a warning sound, and changes the directional characteristics of the warning sound to desired characteristics by signal processing.

In such a manner, the warning sound is generated externally, so that a pedestrian or the like can be notified about approach of the vehicle. However, the warning sound also brings a discomfort feeling to the pedestrian simultaneously with notifying the pedestrian of approach of the vehicle. Further, since the warning sound penetrates a vehicle interior, the warning sound brings the discomfort feeling to not only the pedestrian but also an occupant in the vehicle. When the warning sound to the vehicle interior is attempted to be controlled, other devices such as the microphone are required. Alternatively, in order to generate the control sound, it becomes necessary to perform signal processing for a signal corresponding to the warning sound. Therefore, it is difficult to reduce the discomfort feeling, which is to be brought to the occupant, by simply controlling the warning sound.

As to the warning sound output from a low-noise vehicle such as an electrically driven vehicle and a hybrid vehicle, National Highway Traffic Safety Administration (NHTSA) of North America studies a regulation of a minimum sound pressure value. For example, the minimum sound pressure value is regulated for 8-frequency bands of ⅓ octave, and it is necessary to output a warning sound having at least the minimum sound pressure value when measurement is performed by a predetermined measurement method. Therefore, the sound pressure of the warning sound cannot be made smaller than the minimum sound pressure value. Therefore, there is required a technique for reducing the discomfort feeling, which is to be brought to the occupant, while outputting a warning sound having at least the minimum sound pressure value.

In general, when a plurality of speakers is disposed and identical sounds are output from the speakers in order to output the warning sound having at least the minimum sound pressure value, acoustic energy is focused on a specific frequency and the sounds become noisy. As a result, the discomfort feeling to be brought to the occupant tends to be increased.

The following exemplary embodiments will describe vehicle approach notification devices, each of which can easily output a warning sound, from which the discomfort feeling to be brought to the occupant is reduced, while ensuring the necessary sound pressure.

A vehicle approach notification device according to an aspect of the present disclosure includes: a sound source configured to output a signal corresponding to one sound for making a notification about approach of a vehicle; an amplifier configured to amplify the signal output from the sound source; a first speaker system; and a second speaker system. The first speaker system has a first speaker configured to output a sound based on the signal amplified by the amplifier, and a second speaker configured to output a sound having an opposite phase to the sound output from the first speaker. The second speaker system has a third speaker configured to output a sound having a same phase as the sound output from the first speaker, and a fourth speaker configured to output a sound having an opposite phase to the sound output from the third speaker. The first speaker system and the second speaker system are disposed so that the first speaker and the third speaker are located closer to a longitudinal center plane of the vehicle than the second speaker and the fourth speaker.

In accordance with this, the warning sounds generated from the first speaker, the second speaker, the third speaker, and the fourth speaker are difficult to penetrate a vehicle interior. The warning sound output from the first speaker and the warning sound output from the second speaker are cancelled by each other, and the warning sound output from the third speaker and the warning sound output from the fourth speaker are cancelled by each other. Hence, the discomfort feeling to be brought to the occupant by the warning sounds can be reduced.

An acoustic radiation surface of the first speaker and an acoustic radiation surface of the third speaker may face each other.

In accordance with this, the warning sound output from the first speaker and the warning sound output from the second speaker can be cancelled by each other more surely. Moreover, the warning sound output from the third speaker and the warning sound output from the fourth speaker can be cancelled by each other more surely.

The first speaker and the third speaker may be disposed between the second speaker and the fourth speaker, and the acoustic radiation surface of the first speaker and the acoustic radiation surface of the third speaker may face forward of the vehicle.

In accordance with this, a sound pressure necessary as a warning sound can be ensured particularly in front of the vehicle.

An acoustic radiation surface of the second speaker and an acoustic radiation surface of the fourth speaker may face lateral sides of the vehicle.

In accordance with this, a sound pressure necessary as a warning sound can be ensured particularly on each of the lateral sides of the vehicle.

Either one of the first speaker system and the second speaker system may disposed in front of a driver's seat of the vehicle, and the other one of the first speaker system and the second speaker system may be disposed in front of a passenger's seat of the vehicle.

In accordance with this, directions where the acoustic radiations of the first speaker and the second speaker are the minimum are directed to a direction of the passenger's seat of the vehicle. Accordingly, the warning sounds generated from the first speaker and the second speaker are difficult to penetrate a vicinity of the passenger's seat inside the vehicle. Likewise, directions where the acoustic radiations of the third speaker and the fourth speaker are the minimum are directed to a direction of the driver's seat of the vehicle. Accordingly, the warning sounds generated from the third speaker and the fourth speaker are difficult to penetrate a vicinity of the driver's seat inside the vehicle. Hence, the discomfort feeling to be brought to the occupant by the warning sounds can be reduced.

Hereinafter, exemplary embodiments of the present disclosure will be described with reference to the drawings. Each of the following exemplary embodiments illustrates a specific example of the present invention. Numerical values, shapes, materials, constituent elements, arrangement positions and connection modes of the constituent elements, steps, and an order of the steps, which are illustrated in the following exemplary embodiments, are only by way of example, and therefore are not intended to limit the present invention. Furthermore, among the constituent elements in the following exemplary embodiments, constituent elements not recited in the independent claim indicating the broadest concept are described as optional constituent elements.

(First Exemplary Embodiment)

A vehicle approach notification device according to a first exemplary embodiment includes a plurality of speakers. The plurality of speakers includes at least: a pair of speakers which output warning sounds having different phases; and two speakers which output warning sounds having the same phase. The plurality of speakers is disposed so that the pair of speakers which output the warning sounds having different phases is combined with each other, and that the two speakers which output the warning sounds having the same phase are disposed to face each other with a longitudinal center plane of a vehicle interposed therebetween. Herein, the longitudinal center plane of the vehicle refers to a virtual plane that passes through a center of the vehicle and extends in a front-rear direction and vertical direction of the vehicle. In this manner, a discomfort feeling which a warning sound brings to an occupant can be reduced while ensuring a sound pressure necessary as a warning sound.

First, a configuration of the vehicle approach notification device according to the present exemplary embodiment will be described. FIG. 1 is a block diagram illustrating a configuration of vehicle approach notification device 10 according to the present exemplary embodiment.

As illustrated in FIG. 1, vehicle approach notification device 10 includes sound source 11, first amplifier 14, second amplifier 15, first speaker system 16, and second speaker system 17. Further, first speaker system 16 includes first speaker 16a and second speaker 16b. Second speaker system 17 includes third speaker 17a and fourth speaker 17b. First speaker system 16 may include a speaker box to which first speaker 16a and second speaker 16b are attached. Likewise, second speaker system 17 may include a speaker box to which third speaker 17a and fourth speaker 17b are attached.

Figure 2:
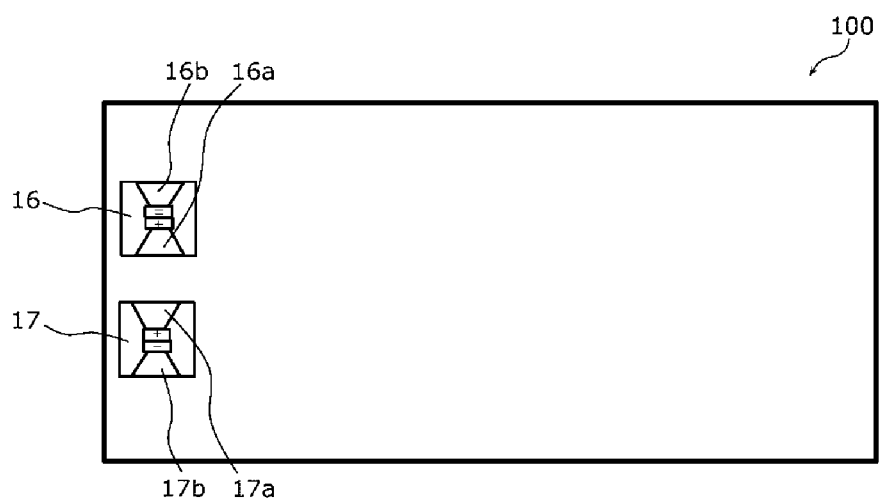
FIG. 2 is a diagram illustrating one example of a vehicle mounted with the vehicle approach notification device according to the first exemplary embodiment.

Sound source 11 generates a signal (an electric signal) corresponding to one warning sound for notifying an outside of approach of vehicle 100 (refer to FIG. 2). For example, the warning sound is an engine sound. In this case, sound source 11 frequently uses a pseudo-engine sound or an electronic sound as the warning sound, and the warning sound includes a low-pitched sound of 300 Hz to 500 Hz and a component having frequencies of 1 kHz to 3 kHz. The warning sound output from sound source 11 may be a simple sinusoidal signal sound or the like. Sound source 11 is connected to first amplifier 14 and second amplifier 15. That is, the signal output from sound source 11 is input into first amplifier 14 and second amplifier 15.

First amplifier 14 is connected between sound source 11 and first speaker system 16. First amplifier 14 amplifies the signal output from sound source 11 at a predetermined amplification degree and outputs the amplified signal to first speaker 16a and second speaker 16b.

Second amplifier 15 is connected between sound source 11 and second speaker system 17. Second amplifier 15 amplifies the signal output from sound source 11 at a predetermined amplification degree and outputs the amplified signal to third speaker 17a and fourth speaker 17b. The amplification degree at this time may be equal to or different from the amplification degree of first amplifier 14.

First amplifier 14 and second amplifier 15 may be analog amplifiers or digital amplifiers.

First speaker 16a, second speaker 16b, third speaker 17a, and fourth speaker 17b output warning sounds for making notification about approach of a vehicle to the outside of the vehicle. Each of first speaker 16a, second speaker 16b, third speaker 17a, and fourth speaker 17b has a function to convert an electric signal into a mechanical vibration, and outputs the warning sound with a sound pressure based on the electric signal.

In first speaker system 16, first speaker 16a and second speaker 16b output warning sounds based on the signal amplified by first amplifier 14. At this time, second speaker 16b outputs a warning sound having an opposite phase to the warning sound output from first speaker 16a.

In second speaker system 17, third speaker 17a and fourth speaker 17b output warning sounds corresponding to the signal output from second amplifier 15. At this time, third speaker 17a outputs a warning sound having the same phase as the warning sound output from first speaker 16a. Fourth speaker 17b outputs a warning sound having an opposite phase to the warning sound output from third speaker 17a.

In FIG. 1, symbols "+" indicate that the signals are in a positive phase, and symbols "−" indicate that the signals are in a negative phase that is the opposite phase to the positive phase mentioned above. Herein, the same phase and the opposite phase will be briefly described. For example, when the output warning sound is a sinusoidal signal sound, such a warning sound having the same phase as the warning sound output from first speaker 16a refers to a warning sound having the same phase as the sinusoidal signal sound. Meanwhile, for example, when the output warning sound is a sinusoidal signal sound, such a warning sound having the opposite phase to the warning sound output from first speaker 16a refers to a warning sound having an opposite phase to the sinusoidal signal sound. The phases of the warning sounds output from first speaker 16a, second speaker 16b, third speaker 17a, and fourth speaker 17b are adjusted by circuits (not illustrated) built in sound source 11, first amplifier 14, and second amplifier 15, or by circuits (not illustrated) built in first speaker 16a, second speaker 16b, third speaker 17a, and fourth speaker 17b.

With regard to an adjustment method of the phases, the phases are adjusted by a phase shifter circuit or the like.

In first speaker system 16, first speaker 16a and second speaker 16b are disposed so that acoustic radiation surfaces of first speaker 16a and second speaker 16b are reverse to each other. That is, first speaker 16a and second speaker 16b are disposed so that a principal axis direction of the acoustic radiation of first speaker 16a and a principal axis direction of the acoustic radiation of second speaker 16b are reverse to each other.

Likewise, in second speaker system 17, third speaker 17a and fourth speaker 17b are disposed so that acoustic radiation surfaces of third speaker 17a and fourth speaker 17b are reverse to each other. That is, third speaker 17a and fourth speaker 17b are disposed so that a principal axis direction of the acoustic radiation of third speaker 17a and a principal axis direction of the acoustic radiation of fourth speaker 17b are reverse to each other.

The acoustic radiation surface of first speaker 16a and the acoustic radiation surface of third speaker 17a face each other. A disposition relationship among first speaker 16a, second speaker 16b, third speaker 17a, and fourth speaker 17b will be described later.

Figure 3A:
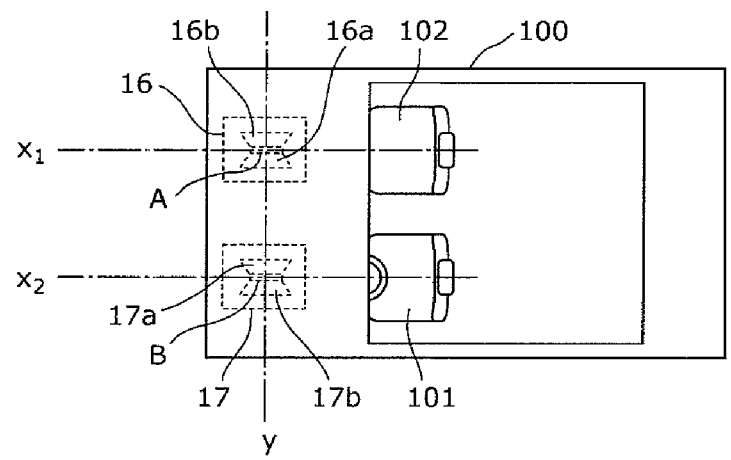
FIG. 3A is a pattern diagram of the vehicle mounted with the vehicle approach notification device according to the first exemplary embodiment as viewed from above.
Figure 3B:
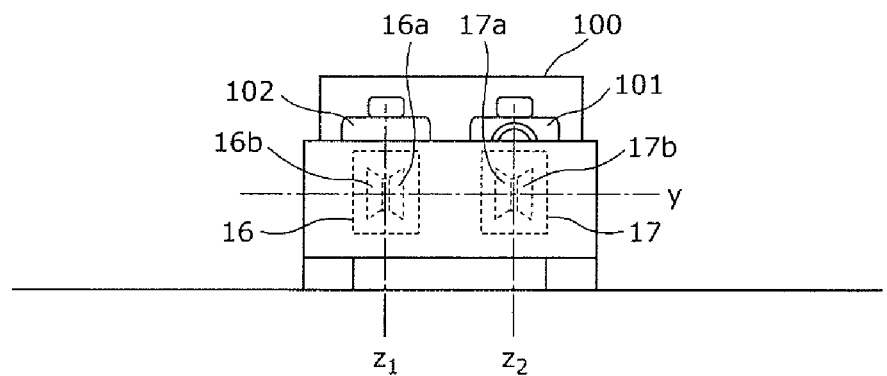
FIG. 3B is a pattern diagram of the vehicle mounted with the vehicle approach notification device according to the first exemplary embodiment as viewed from front.

FIG. 2 is a diagram illustrating one example of the vehicle mounted with vehicle approach notification device 10 according to the present exemplary embodiment. FIG. 3A is a pattern diagram of the vehicle mounted with vehicle approach notification device 10 according to the present exemplary embodiment as viewed from above. FIG. 3B is a pattern diagram of the vehicle mounted with vehicle approach notification device 10 according to the present exemplary embodiment as viewed from front. In FIG. 3A, alternate long and short dash line x1 indicates a line-symmetric line in a horizontal direction, which is located at an equal interval distance from the respective acoustic radiation surfaces of first speaker 16a and second speaker 16b in first speaker system 16. Alternate long and short dash line x2 indicates a line-symmetric line in the horizontal direction, which is located at an equal interval distance from the respective acoustic radiation surfaces of third speaker 17a and fourth speaker 17b in second speaker system 17. Alternate long and short dash line y indicates a centerline passing through centers of the respective acoustic radiation surfaces of first speaker 16a, second speaker 16b, third speaker 17a, and fourth speaker 17b. In FIG. 3B, alternate long and short dash line z1 indicates a line-symmetric line in the vertical direction, which is located at an equal interval distance from the respective acoustic radiation surfaces of first speaker 16a and second speaker 16b in first speaker system 16. Alternate long and short dash line z2 indicates a line-symmetric line in the vertical direction, which is located at an equal interval distance from the respective acoustic radiation surfaces of third speaker 17a and fourth speaker 17b in second speaker system 17. An intersection of symmetric line x1, symmetric line z1 and centerline y is indicated by point A, and an intersection of symmetric line x2, symmetric line z2 and centerline y is indicated by point B.

In vehicle approach notification device 10, first speaker system 16 and second speaker system 17 are disposed at a predetermined interval on two spots in a front portion of vehicle 100. For example, first speaker system 16 and second speaker system 17 are disposed in an engine room of vehicle 100. In the engine room of vehicle 100, as illustrated in FIG. 3A, first speaker system 16 is disposed in front of passenger's seat 102 of vehicle 100, and second speaker system 17 is disposed in front of driver's seat 101 of vehicle 100.

Specifically, as illustrated in FIG. 3A and FIG. 3B, first speaker system 16 is installed so that a center portion of passenger's seat 102 is superimposed on the symmetric line indicated by alternate long and short dash line x1. Second speaker system 17 is installed so that a center portion of driver's seat 101 is superimposed on the symmetric line indicated by alternate long and short dash line x2. Moreover, first speaker system 16 and second speaker system 17 are installed so that positions of centerlines of first speaker system 16 and second speaker system 17, the centerlines being indicated by alternate long and short dash line y, are identical to each other. First speaker system 16 and second speaker system 17 are disposed so that the center of first speaker system 16 is superimposed on a position of point A, and that the center of second speaker system 17 is superimposed on a position of point B. The acoustic radiation surface of second speaker 16b and the acoustic radiation surface of fourth speaker 17b face lateral sides of vehicle 100.

Moreover, first speaker system 16 and second speaker system 17 are disposed and installed as follows. That is, first speaker 16a and third speaker 17a are disposed between second speaker 16b and fourth speaker 17b. Moreover, first speaker 16a and third speaker 17a are installed so that the acoustic radiation surface of first speaker 16a and the acoustic radiation surface of third speaker 17a face each other. First speaker 16a and second speaker 16b are disposed so that the acoustic radiation surfaces of first speaker 16a and second speaker 16b are reverse to each other. Third speaker 17a and fourth speaker 17b are disposed so that the acoustic radiation surfaces of third speaker 17a and fourth speaker 17b are reverse to each other. Moreover, as illustrated in FIG. 3B, first speaker system 16 and second speaker system 17 are installed at substantially the same height. For example, first speaker system 16 and second speaker system 17 are installed at a position approximately 1.2 m high.

That is, in vehicle 100, first speaker system 16 and second speaker system 17 are disposed so that first speaker 16a and third speaker 17a are located closer to a longitudinal center plane of the vehicle than second speaker 16b and fourth speaker 17b.

Figure 4:
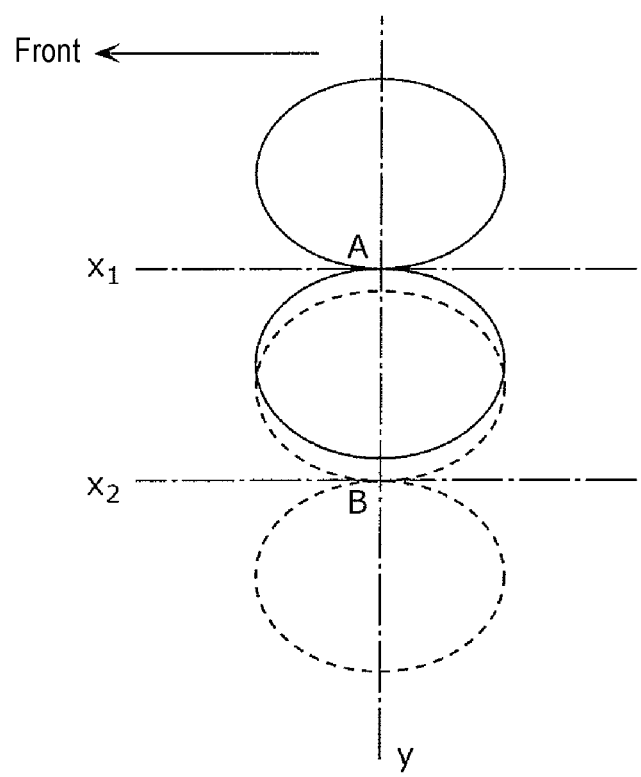
FIG. 4 is a diagram illustrating one example of directional characteristics of speakers of the vehicle approach notification device according to the first exemplary embodiment.

With such a configuration, the respective speaker directional characteristics of first speaker 16a, second speaker 16b, third speaker 17a, and fourth speaker 17b become as follows. FIG. 4 is a diagram illustrating one example of the directional characteristics of the speakers of vehicle approach notification device 10 according to the present exemplary embodiment. In FIG. 4, solid lines indicate one example of the directional characteristics of first speaker 16a and second speaker 16b, and broken lines indicate the directional characteristics of third speaker 17a and fourth speaker 17b.

As shown by the sold lines in FIG. 4, the directional characteristics of first speaker 16a and second speaker 16b have the following feature. That is, since the warning sounds spread in the principal axis direction of the acoustic radiation of first speaker 16a and the principal axis direction of the acoustic radiation of second speaker 16b, the warning sounds are difficult to propagate in such a direction going along alternate long and short dash line x1. As shown by the broken lines in FIG. 4, the directional characteristics of third speaker 17a and fourth speaker 17b have the following feature. That is, since the warning sounds spread in the principal axis direction of the acoustic radiation of third speaker 17a and the principal axis direction of the acoustic radiation of fourth speaker 17b, the warning sounds are difficult to propagate in such a direction going along alternate long and short dash line x2.

In this manner, directions where the acoustic radiations of first speaker 16a and second speaker 16b are the minimum are directed to the direction of passenger's seat 102 of vehicle 100. Accordingly, the warning sounds generated from first speaker 16a and second speaker 16b are difficult to penetrate a vicinity of passenger's seat 102 inside vehicle 100. Likewise, directions where the acoustic radiations of third speaker 17a and fourth speaker 17b are the minimum are directed to the direction of driver's seat 101 of vehicle 100. Accordingly, the warning sounds generated from third speaker 17a and fourth speaker 17b are difficult to penetrate a vicinity of driver's seat 101 inside vehicle 100.

Second speaker 16b outputs the warning sound having the opposite phase to the warning sound output from first speaker 16a. Accordingly, the warning sound output from first speaker 16a and the warning sound output from second speaker 16b are cancelled by each other. Likewise, fourth speaker 17b outputs the warning sound having the opposite phase to the warning sound output from third speaker 17a. Accordingly, the warning sound output from third speaker 17a and the warning sound output from fourth speaker 17b are cancelled by each other.

In this manner, the discomfort feeling to be brought to the occupant by the warning sounds can be reduced.

First speaker 16a and third speaker 17a in which the acoustic radiation surfaces face each other output the warning sounds having the same phase. Accordingly, in a vicinity of a center in the front portion of vehicle 100, both of the warning sounds output individually from first speaker 16a and third speaker 17a are synthesized with each other and propagate. Therefore, the synthesized warning sound becomes large.

The acoustic radiation surface of second speaker 16b and the acoustic radiation surface of fourth speaker 17b face the lateral sides of vehicle 100, and the warning sounds output from second speaker 16b and fourth speaker 17b have the same phase. Accordingly, these warning sounds are transferred to the lateral sides of vehicle 100 without being cancelled by each other.

In this manner, sound pressures necessary for the warning sounds can be ensured.

As above, vehicle approach notification device 10 according to the present exemplary embodiment includes first speaker system 16 and second speaker system 17. First speaker system 16 includes first speaker 16a, and second speaker 16b that outputs the sound having the opposite phase to the sound output from the first speaker. Second speaker system 17 includes third speaker 17a that outputs the sound having the same phase as the sound output from first speaker 16a, and fourth speaker 17b that outputs the sound having the opposite phase to the sound output from the third speaker. First speaker 16a and third speaker 17a are disposed closer to the longitudinal center plane of the vehicle than second speaker 16b and fourth speaker 17b. That is, first speaker 16a and third speaker 17a are disposed to face each other with the longitudinal center plane of vehicle 100 interposed therebetween, and second speaker 16b and fourth speaker 17b are disposed on the lateral sides of vehicle 100.

In this manner, vehicle approach notification device 10 can easily output the warning sound in which the discomfort feeling brought to the occupant is reduced while ensuring the warning sound having the necessary sound pressure.

Vehicle approach notification device 10 generates the warning sounds, which are output from first speaker 16a, second speaker 16b, third speaker 17a, and fourth speaker 17b, toward the pedestrian outside the vehicle. Accordingly, first speaker 16a, second speaker 16b, third speaker 17a, and fourth speaker 17b may be installed outside vehicle 100.

Positions of first speaker system 16 and second speaker system 17 with respect to vehicle 100 in front-rear, left-right and up-down directions are not limited to the example mentioned above, and may be changed. For example, first speaker system 16 and second speaker system 17 may be installed at positions which are located at a crosswise center of vehicle 100, where the warning sounds become the largest at a position 2 m ahead of vehicle 100. First speaker system 16 and second speaker system 17 may be installed at positions different in height.

The principal axis directions of the acoustic radiations of first speaker 16a, second speaker 16b, third speaker 17a, and fourth speaker 17b are not limited to the example mentioned above, and may be changed. For example, first speaker system 16 and second speaker system 17 may be installed so that the principal axis directions of the acoustic radiations of first speaker 16a and third speaker 17a are directed to the front of vehicle 100. First speaker system 16 and second speaker system 17 may be installed while being rotated at a predetermined angle in the up-down direction of vehicle 100 so that the principal axis directions of the acoustic radiations of first speaker 16a and third speaker 17a are directed to obliquely upward. The disposed positions and orientations of the speakers will be described in detail.

The number and disposed positions of the speaker systems are not limited to the above-mentioned number and may be changed. For example, the speaker systems are not limited to the above-mentioned configuration in which the speaker boxes are provided at two spots in front of the driver's seat and the passenger's seat, and may have a configuration in which the speaker boxes are provided at two spots in the rear of the driver's seat and the passenger's seat. The speaker systems may have a configuration in which the speaker boxes are provided at two spots for each of the front and rear of the driver's seat and the passenger's seat.

Vehicle approach notification device 10 may interpose a filter between sound source 11 and first amplifier 14 or between sound source 11 and second amplifier 15. The filter is a processor for performing some processing for the signal output from sound source 11. The filter may be, for example, an amplitude modulator, a frequency modulator, a phase modulator, a delay filter, or a pitch converter.

(Modification)

Next, a modification of the first exemplary embodiment will be described below. FIG. 5 is a block diagram of vehicle approach notification device 20 according to the present modification.

Vehicle approach notification device 20 is not limited to the configuration of vehicle approach notification device 10 illustrated in the first exemplary embodiment mentioned above, and for example, may have a configuration of including only one amplifier. The above will be described in detail below.

As illustrated in FIG. 5, vehicle approach notification device 20 according to the present modification includes sound source 11, third amplifier 24, first speaker system 16, and second speaker system 17. Configurations of sound source 11, first speaker system 16, and second speaker system 17 are similar to the configurations in vehicle approach notification device 10 illustrated in the first exemplary embodiment, and accordingly, a description thereof will be omitted.

Third amplifier 24 is connected between sound source 11 and first and second speaker systems 16 and 17. Like first and second amplifiers 14 and 15 illustrated in the first exemplary embodiment, third amplifier 24 amplifies a signal output from sound source 11 at a predetermined amplification degree and outputs the same signal to both of first speaker system 16 and second speaker system 17.

More specifically, third amplifier 24 outputs the same signal so that first speaker 16a of first speaker system 16 and third speaker 17a of second speaker system 17 output warning sounds having the same phase. Third amplifier 24 outputs the same signal so that second speaker 16b of first speaker system 16 and fourth speaker 17b of second speaker system 17 output warning sounds having an opposite phase to the warning sounds output from first speaker 16a and third speaker 17a.

As described above, first speaker system 16 and second speaker system 17 share third amplifier 24, whereby the configuration of vehicle approach notification device 20 can be simplified.

(Second Exemplary Embodiment)

Figure 6A:
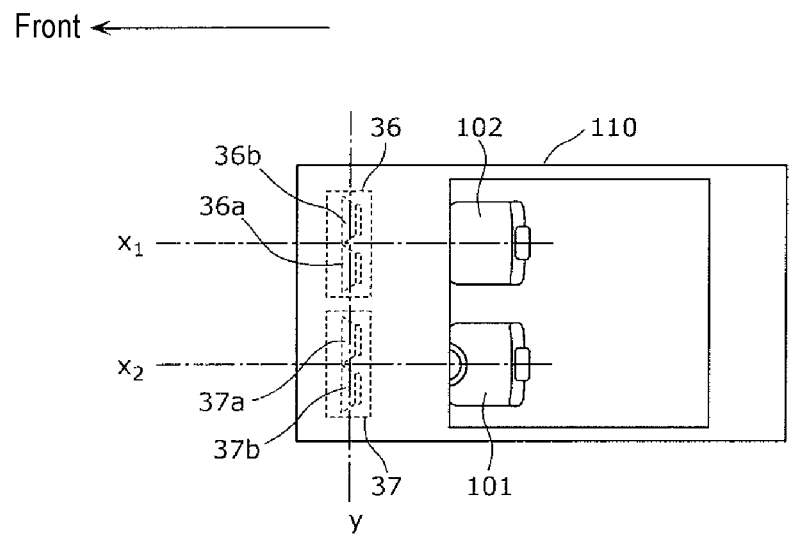
FIG. 6A is a pattern diagram of a vehicle mounted with a vehicle approach notification device according to a second exemplary embodiment as viewed from above.
Figure 6B:
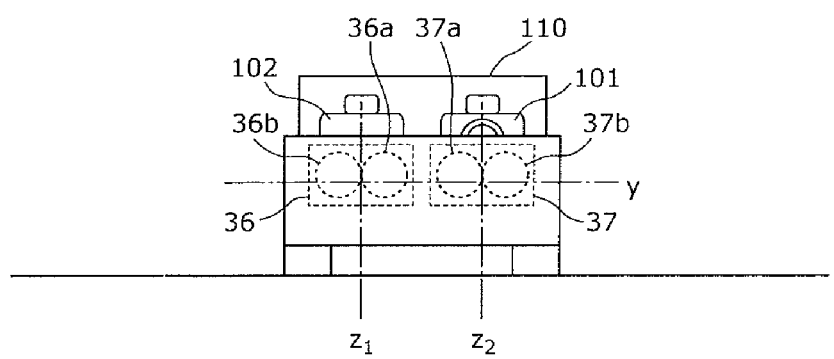
FIG. 6B is a pattern diagram of the vehicle mounted with the vehicle approach notification device according to the second exemplary embodiment as viewed from front.

Next, a vehicle approach notification device according to a second exemplary embodiment will now be described herein. FIG. 6A is a pattern diagram of a vehicle mounted with the vehicle approach notification device according to the present exemplary embodiment as viewed from above. FIG. 6B is a pattern diagram of the vehicle mounted with the vehicle approach notification device according to the present exemplary embodiment as viewed from front.

The vehicle approach notification device according to the present exemplary embodiment is different from vehicle approach notification device 10 illustrated in the first exemplary embodiment in that acoustic radiation surfaces of speakers face forward in a traveling direction of vehicle 110. A description will be given below of only such points different from vehicle approach notification device 10 illustrated in the first exemplary embodiment.

The vehicle approach notification device according to the present exemplary embodiment includes first speaker system 36 and second speaker system 37. First speaker system 36 includes first speaker 36a and second speaker 36b. Second speaker system 37 includes third speaker 37a and fourth speaker 37b. First speaker system 36 may include a speaker box to which first speaker 36a and second speaker 36b are attached. Likewise, second speaker system 37 may include a speaker box to which third speaker 37a and fourth speaker 37b are attached.

In the vehicle approach notification device according to the present exemplary embodiment, first speaker 36a and third speaker 37a output warning sound having the same phase. Second speaker 36b outputs a warning sound having an opposite phase to the warning sound output from first speaker 36a. Fourth speaker 37b outputs a warning sound having an opposite phase to the warning sound output from third speaker 37a.

As illustrated in FIG. 6A and FIG. 6B, in first speaker system 36 and second speaker system 37, first speaker 36a and third speaker 37a are disposed between second speaker 36b and fourth speaker 37b. That is, in vehicle 110, second speaker 36b and fourth speaker 37b are disposed so as to be located on lateral sides of vehicle 110, and first speaker 36a and third speaker 37a are disposed so as to be located closer to a longitudinal center plane of the vehicle than second speaker 36b and fourth speaker 37b. Acoustic radiation surfaces of first speaker 36a, second speaker 36b, third speaker 37a, and fourth speaker 37b face forward of vehicle 110.

Generally, in a speaker system including two speakers which output warning sound having opposite phases, vibrations caused by the warning sounds output from the respective speakers are transferred to the entire speaker box attached with the speakers. Hence, even if the acoustic radiation surfaces of the respective speakers are not disposed to be reverse to each other, the warning sounds having the opposite phases affect each other in the speaker box, and are cancelled by each other though are not cancelled completely.

Hence, the warning sound output from first speaker 36a and the warning sound output from second speaker 36b are cancelled by each other, and the warning sound output from third speaker 37a and the warning sound output from fourth speaker 37b are cancelled by each other. To a vicinity of a center in front of vehicle 110, both of the warning sounds output individually from first speaker 36a and third speaker 37a are transferred. Therefore, the warning sound thus synthesized becomes large.

As described above, the acoustic radiation surfaces of the speakers face forward in the traveling direction of vehicle 110, whereby the vehicle approach notification device according to the present exemplary embodiment can increase a volume of the warning sound in front of vehicle 110. Hence, the discomfort feeling which the warning sound brings to the occupant can be reduced while ensuring such a sound pressure necessary as the warning sound particularly in front of vehicle 110.

(Third Exemplary Embodiment)

Figure 7A:
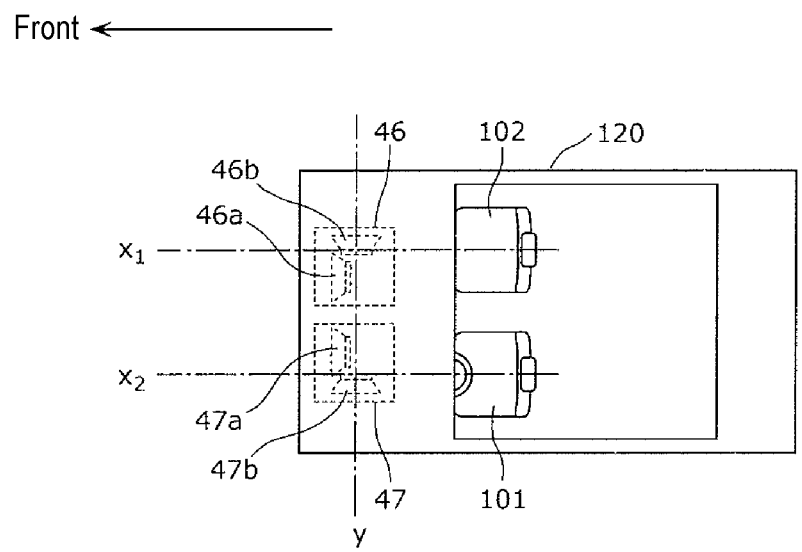
FIG. 7A is a pattern diagram of a vehicle mounted with a vehicle approach notification device according to a third exemplary embodiment as viewed from above.
Figure 7B:
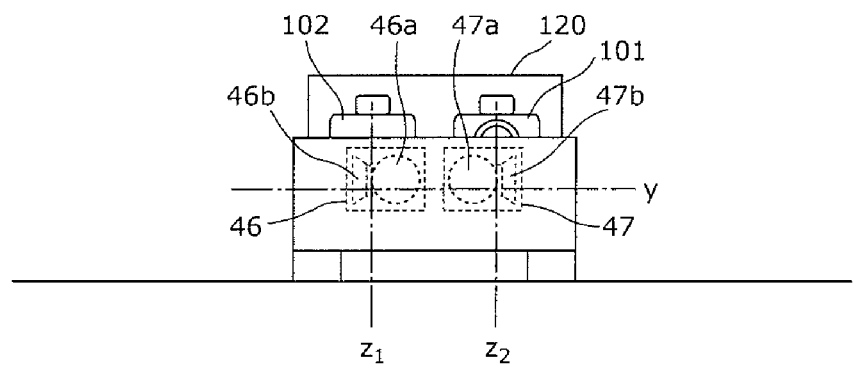
FIG. 7B is a pattern diagram of the vehicle mounted with the vehicle approach notification device according to the third exemplary embodiment as viewed from front.

Next, a vehicle approach notification device according to a third exemplary embodiment will now be described herein. FIG. 7A is a pattern diagram of a vehicle mounted with a vehicle approach notification device according to the present exemplary embodiment as viewed from above. FIG. 7B is a pattern diagram of the vehicle mounted with the vehicle approach notification device according to the present exemplary embodiment as viewed from front.

The vehicle approach notification device according to the present exemplary embodiment is different from the vehicle approach notification device according to the second exemplary embodiment in that acoustic radiation surfaces of speakers disposed on a longitudinal center plane side of the vehicle are disposed so as to be directed forward in a traveling direction of the vehicle, and that acoustic radiation surfaces of speakers disposed on lateral sides of the vehicle are disposed so as to be directed to the lateral sides of the vehicle. A description will be given below of only such points different from the vehicle approach notification device illustrated in the second exemplary embodiment.

The vehicle approach notification device according to the present exemplary embodiment includes first speaker system 46 and second speaker system 47. First speaker system 46 includes first speaker 46a and second speaker 46b. Second speaker system 47 includes third speaker 47a and fourth speaker 47b. First speaker system 46 may include a speaker box to which first speaker 46a and second speaker 46b are attached. Likewise, second speaker system 47 may include a speaker box to which third speaker 47a and fourth speaker 47b are attached.

Functions of first speaker 46a, second speaker 46b, third speaker 47a, and fourth speaker 47b are similar to functions of first speaker 36a, second speaker 36b, third speaker 37a, and fourth speaker 37b, which are illustrated in the second exemplary embodiment, and a description thereof will be omitted.

As illustrated in FIG. 7A and FIG. 7B, in first speaker system 46 and second speaker system 47, first speaker 46a and third speaker 47a are disposed between second speaker 46b and fourth speaker 47b. That is, in vehicle 120, second speaker 46b and fourth speaker 47b are disposed so as to be located on lateral sides of vehicle 120, and first speaker 46a and third speaker 47a are disposed so as to be located closer to a longitudinal center plane of the vehicle than second speaker 46b and fourth speaker 47b. Acoustic radiation surfaces of first speaker 46a and third speaker 47a face forward of vehicle 120. Acoustic radiation surfaces of second speaker 46b and fourth speaker 47b face the lateral sides of vehicle 120.

Hence, the warning sound output from first speaker 46a and the warning sound output from second speaker 46b are cancelled by each other, and the warning sound output from third speaker 47a and the warning sound output from fourth speaker 47b are cancelled by each other. To a vicinity of a center in front of vehicle 120, both of the warning sounds output individually from first speaker 46a and third speaker 47a are synthesized and transferred. Therefore, the warning sound thus synthesized becomes large. The acoustic radiation surface of second speaker 46b and the acoustic radiation surface of fourth speaker 47b face the lateral sides of vehicle 120, and the warning sounds output from second speaker 46b and fourth speaker 47b have the same phase. Accordingly, these warning sounds are transferred to the lateral sides of vehicle 120 without being cancelled by each other.

As described above, the acoustic radiation surfaces of the speakers disposed on the center side of vehicle 120 face forward in the traveling direction of vehicle 120, and the acoustic radiation surfaces of the speakers disposed on the lateral sides of vehicle 120 face the lateral sides of vehicle 120. In this manner, the vehicle approach notification device according to the present exemplary embodiment can also increase volumes of the warning sounds on the lateral sides while increasing volumes of the warning sounds in front of vehicle 120. Hence, the discomfort feeling which the warning sound brings to the occupant can be reduced while ensuring such sound pressures necessary as the warning sounds particularly in front of vehicle 120 and on the lateral sides of vehicle 120.

The vehicle approach notification device according to each of the exemplary embodiments and modification of the present invention has been described above. However, the present invention is not limited to the exemplary embodiments and the modification.

At least a part of the constituent elements of the vehicle approach notification device according to each of the exemplary embodiments may be implemented as a large-scale integration (LSI) circuit. Each of the constituent elements may be integrated into one chip, or some or all of the constituent elements may be integrated into one chip.

The circuit integration is not limited to the LSI, and may be achieved by a dedicated circuit or a general-purpose processor. There may be used: a field programmable gate array (FPGA) programmable after the LSI is fabricated; or a reconfigurable processor in which connections and settings of circuit cells in the LSI are reconfigurable.

That is, in each of the above-described exemplary embodiments, the respective constituent elements may be configured of dedicated hardware or may be implemented by execution of software programs suitable for the respective constituent elements. The constituent elements may be implemented in such a manner that a program execution section such as a central processing unit (CPU) and a processor reads and executes software programs recorded in a recording medium such as a hard disk and a semiconductor memory.

All the numerals described above are used only for the specific illustration of the present disclosure, and the present disclosure is not limited to the illustrated numerals.

The division of the functional block in the block diagram is only by way of example, and a plurality of functional blocks may be implemented as one functional block, one functional block may be divided into a plurality of functional blocks, or a part of the functions may be transferred to another functional block. Functions of a plurality of functional blocks having similar functions may be processed in parallel or in a time division manner by single piece of hardware or software.

The vehicle approach notification devices according to one or more aspects have been described above based on the exemplary embodiments. However, the present disclosure is not limited to the exemplary embodiments.

Configurations in which various variations conceived by those skilled in the art are applied to the present exemplary embodiments, and configurations constructed by combining the constituent element in different exemplary embodiments may also fall within the scope of one or more aspects without departing from the spirit of the present disclosure.

INDUSTRIAL APPLICABILITY

The present disclosure is suitable for the vehicle approach notification device mounted on the low-noise vehicle such as the electrically driven vehicle and the hybrid vehicle.

REFERENCE MARKS IN THE DRAWINGS 10, 20: vehicle approach notification device
11: sound source
14: first amplifier
15: second amplifier
16, 36, 46: first speaker system
16a, 36a, 46a: first speaker
16b, 36b, 46b: second speaker
17, 37, 47: second speaker system
17a, 37a, 47a: third speaker
17b, 37b, 47b: fourth speaker
24: third amplifier
100, 110, 120: vehicle
101: driver's seat
102: passenger's seat

The invention claimed is:

1. A vehicle approach notification device mounted on a vehicle, the vehicle approach notification device externally making a notification about approach of the vehicle, the vehicle approach notification device comprising:
    a sound source configured to output a signal corresponding to one sound for making the notification about the approach of the vehicle;
    an amplifier configured to amplify the signal output from the sound source;
    a first speaker system including a first speaker configured to output a sound based on the signal amplified by the amplifier and a second speaker configured to output a sound having an opposite phase to the sound output from the first speaker; and
    a second speaker system including a third speaker configured to output a sound having a same phase as the sound output from the first speaker and a fourth speaker configured to output a sound having an opposite phase to the sound output from the third speaker,
    wherein the first speaker system and the second speaker system are disposed so that the first speaker and the third speaker are located closer to a longitudinal center plane of the vehicle than the second speaker and the fourth speaker.

2. The vehicle approach notification device according to claim 1,
    wherein an acoustic radiation surface of the first speaker and an acoustic radiation surface of the third speaker face each other.

3. The vehicle approach notification device according to claim 1,
    wherein the first speaker and the third speaker are disposed between the second speaker and the fourth speaker, and
    an acoustic radiation surface of the first speaker and an acoustic radiation surface of the third speaker face forward of the vehicle.

4. The vehicle approach notification device according to any one of claims 1 to 3,
    wherein an acoustic radiation surface of the second speaker and an acoustic radiation surface of the fourth speaker face lateral sides of the vehicle.

5. The vehicle approach notification device according to claim 1,
    wherein either one of the first speaker system and the second speaker system is disposed in front of a driver's seat of the vehicle, and
    an other one of the first speaker system and the second speaker system is disposed in front of a passenger's seat of the vehicle.

* * * * *